US008379107B2

(12) United States Patent
Chen

(10) Patent No.: US 8,379,107 B2
(45) Date of Patent: Feb. 19, 2013

(54) FLICKER DETECTION METHOD AND IMAGE SENSING DEVICE UTILIZING THE SAME

(75) Inventor: Jau-Yu Chen, Taipei (TW)

(73) Assignee: Lite-On Semiconductor Corp., Taipei Hsien (TW)

( * ) Notice: Subject to any disclaimer, the term of this patent is extended or adjusted under 35 U.S.C. 154(b) by 177 days.

(21) Appl. No.: 12/764,387

(22) Filed: Apr. 21, 2010

(65) Prior Publication Data

US 2011/0157416 A1    Jun. 30, 2011

(30) Foreign Application Priority Data

Dec. 31, 2009  (CN) .......................... 2009 1 0216917

(51) Int. Cl.
*H04N 9/73*      (2006.01)
(52) U.S. Cl. ................ 348/227.1; 348/226.1; 348/228.1
(58) Field of Classification Search ............... 348/226.1, 348/447, E5.11
See application file for complete search history.

(56) References Cited

U.S. PATENT DOCUMENTS

| 6,295,085 | B1* | 9/2001 | Munson et al. ............ 348/226.1 |
| 2003/0112343 | A1* | 6/2003 | Katoh et al. ............... 348/226.1 |
| 2004/0165084 | A1* | 8/2004 | Yamamoto et al. ........ 348/226.1 |
| 2004/0201729 | A1* | 10/2004 | Poplin et al. ............... 348/226.1 |
| 2007/0153094 | A1* | 7/2007 | Noyes et al. ............... 348/226.1 |
| 2008/0278603 | A1* | 11/2008 | Lee et al. ................... 348/226.1 |
| 2011/0242359 | A1* | 10/2011 | Lee et al. ................... 348/226.1 |

\* cited by examiner

*Primary Examiner* — Roberto Velez
*Assistant Examiner* — Abdelaaziz Tissire
(74) *Attorney, Agent, or Firm* — Rosenberg, Klein & Lee

(57) ABSTRACT

A flicker detection method of an image sensing device is disclosed. The image sensing device includes a sensor and a processor. The method comprises steps of: sequentially detecting multiple frames according to a frame rate, wherein each of the multiple frames includes a light signal; generating a light intensity information based on the light signals; determining a sampling window according to a predetermined detection frequency and the frame rate; dividing the light intensity information into multiple light intensity groups according to the sampling window; distinguishing a feature of each light intensity group, and recording an index position of each feature of the light intensity groups; calculating, individually, a difference between the index positions of the adjacent light intensity groups; and determining whether the differences are patterned, in order to determine whether the light intensity information corresponds to a flicker.

4 Claims, 5 Drawing Sheets

FLICKER DETECTION METHOD AND IMAGE SENSING DEVICE UTILIZING THE SAME

BACKGROUND OF THE INVENTION

1. Field of the Invention

The present invention relates to flicker detection method, and more particularly, to a flicker detection method that is capable of detecting the flicker in the captured images by locating patterns in the difference of the positions of features associated with the flicker.

2. Description of Related Art

Many image sensing devices are configured to detect images and process the captured images based on the brightness of light shown in the images. However, when capturing an image at a frequency that is different to the frequency of switching on/off a light source a "flicker," which is a periodical light flashing associated with the captured image, may take place.

The flicker may undermine the performance of the image sensing devices unless the image sensing devices are equipped with additional components such as frequency identifiers so as to calculate polarities of light intensity via algorithms like Fast Fourier Transform (FFT) before detecting the presence of the flicker.

SUMMARY OF THE INVENTION

The present invention provides a flicker detection method by an image sensing device, which is used for detecting the flicker in the images captured by the image sensing device.

One embodiment of the present invention provides a flicker detection method of an image sensing device, including: sequentially detecting multiple frames according to a frame rate, wherein each of the multiple frames includes a light signal; generating a light intensity information based on the light signals; determining a sampling window according to a predetermined detection frequency and the frame rate; dividing the light intensity information into multiple light intensity groups according to the sampling window; distinguishing a feature of each light intensity group, and recording an index position of each feature of the light intensity groups; individually calculating a difference between the index positions of the adjacent light intensity groups; and determining whether the differences are patterned, in order to determine whether the light intensity information corresponds to a flicker.

Another embodiment of the present invention provides an image sensing device capable of detecting flicker. The device includes a sensor and a processor. The sensor sequentially senses a plurality of frames based on a frame rate, wherein the plurality of frames include light signals of different light intensities. The sensor also generates a light intensity information according to the light signals. The processor divides the light intensity information into multiple light intensity groups, determining an index position of a feature of each light intensity group, and calculates a difference between index positions of the adjacent light intensity groups. The processor further determines whether the light intensity information corresponds to the flicker flicking at a predetermined detection frequency according to the difference in the light intensities.

The method and the device disclosed in the present invention help to filter the flicker from the light signals. So that the image sensing device may get the accurate light information within the images captured by the device, and perform a better image processing based on the accurate light information.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
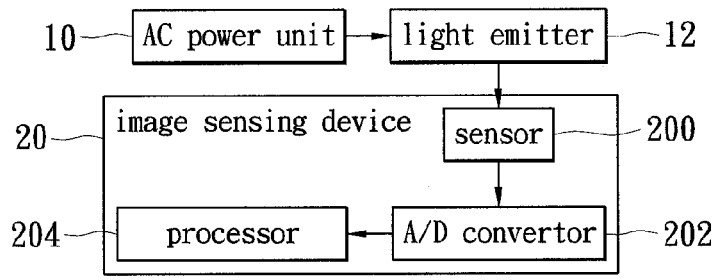
FIG. 1 shows a block diagram of an image sensing device capable of detecting flicker according to an embodiment of the present invention.

Please refer to FIG. 1, which shows a block diagram of an image sensing device capable of detecting flicker according to an embodiment of the present invention. The device 20 includes a sensor 200, an (analog to digital) A/D convertor 202, and a processor 204.

The image sensing device 20 may be located along with a light emitter 12. The light emitter 12 might emit fluorescent light and might be powered by an alternating current (AC) power unit 10. The light that is emitted from the light emitter 12 might periodically switch between "bright" and "dark" as the result of the alternating current provided by the AC power unit 10. Common switch frequencies of the AC power unit 10 are 50 Hz and 60 Hz, which causes the light emitter 12 to generate the flicker with frequencies of 100 Hz and 120 Hz.

The sensor 200 might be a linear sensor or an area sensor, used to capture a series of frames at a predetermined frame rate. The processor 204 might process the captured frames by comparing light intensity in the frames. For example, the image sensing device 20 might be a digital camera and the sensor 200 (e.g. charge coupling device (CCD)) may sense and capture light signals associated with the frames. The processor 204 (e.g. micro-controller unit (MCU) or digital signal processor (DSP) of the camera) could adjust the exposure and/or perform an automatic focusing according to the light intensity of the light signals. Since the image sensing device 20 is located along with the light emitter 12 flashing 100 or 120 times per second, the image sensing device 20 may periodically sense the switch between "bright" and "dark" of the light emitter 12. Thus, the image sensing device 20 may need to separate the light signals with such light intensity swing from the light signals associated with general images, in order to prevent the image sensing device 20 from erring in processing them in the same way.

The A/D convertor 202 converts analog-based light signals sensed by the sensor 202 into digital-based light signals and then transmits the digital-based light signals to the processor 204. The processor 204 may in turn detect the presence of the flicker according to the periodical changes in the digital-based light signals. In view of the well-developed technique of the sensor, people skilled in the art might modify the image sensing device 20 shown in FIG. 1, such as integrates the function of the A/D convertor 202 into the sensor 200 so that the processor 204 may receive the digital-based light signals from the sensor 200.

The sensor 200 of the image sensing device 20 might include one or more sensors, such as using two linear sensors to detect two dimensions of the light signals. If multiple sensors are used to detect the light signals, light information of the light signals may be averaged before the light signals are further processed.

Figure 2:
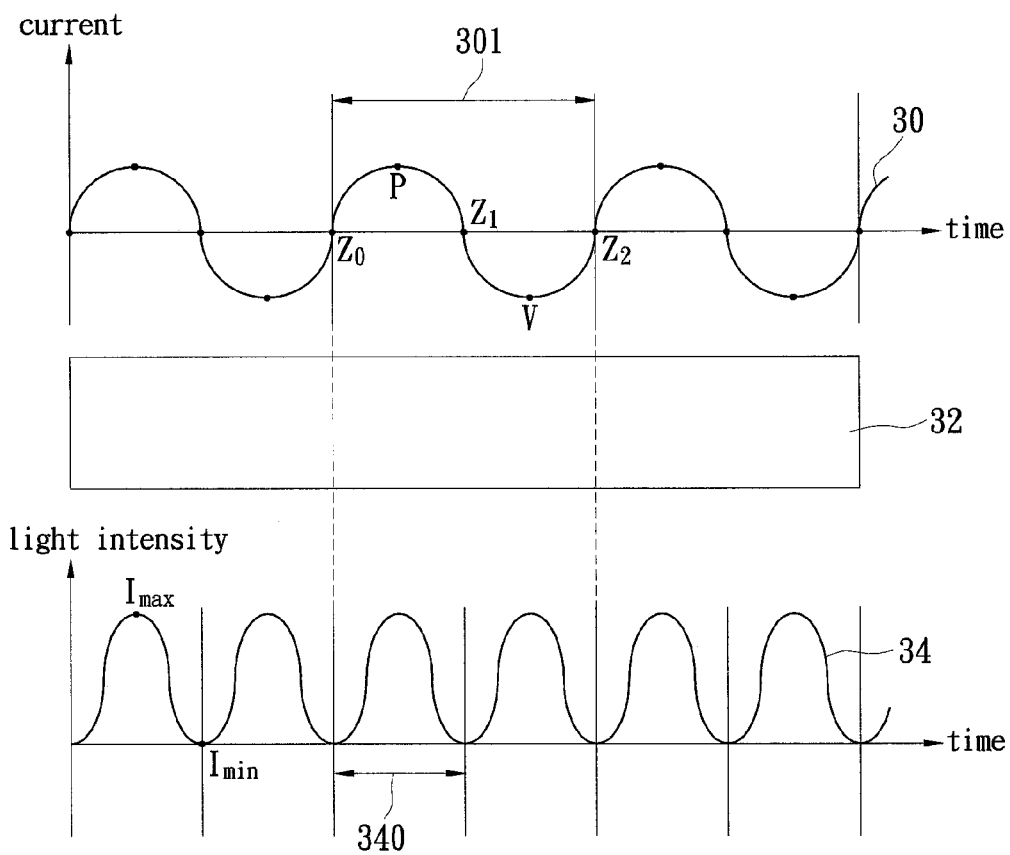
FIG. 2 illustrates variations between an electronic current and light intensity.

In conjunction with FIG. 1, FIG. 2 illustrates variations in the electronic current and light intensity information. Electronic current 30 represents the changes of the alternating current. The horizontal axis shows a time line while the vertical axis shows the amount of the current. The present embodiment uses 60 Hz frequency as an example, which means the time length of each switch cycle 301 is 1/60 second. During the switch cycle 301, the current rises from zero ($Z_0$) to a peak (P), and falls from the peak (P) to zero ($Z_1$). The current then decreases from ($Z_1$) to a valley (V), and returns from valley (V) to zero ($Z_2$). When the current reaches the peak (P) or the valley (V), the AC power unit 10 provides greatest current quantity to the light emitter 12, causing the light emitter 12 to emit a light with the largest light intensity. On the contrary, when the current gets to zero ($Z_0$ or $Z_1$), the light emitter 12 receives no current and thus no light is emitted (i.e., smallest light intensity). In other words, the AC power unit 10 with the switch frequency of 60 Hz would change the direction of electronic current 60 times per second, wherein each of the switch cycle 301 includes two greatest currents and two smallest currents. Hence, the light intensity of the output of the light emitter 12 may switch between the largest light intensity and the smallest light intensity 120 times per second.

The rate of the image sensing device 20 for capturing the frames is much higher than the switching frequency of the current, hence the image sensing device 20 would detect the difference in the light intensity, which may become a noise in the image and increase the likelihood of erroneous image processing.

The electronic current 30 at different levels may correspond to different light intensities. For example, when the current reaches to the peak (P) or valley (V), the light intensities are largest. And when the current returns to zero ($Z_0$, $Z_1$, or $Z_2$), the light intensity in the frame 32 stays at the smallest level. The light flashes caused by the AC power unit 10, which is so called flicker, shows a regular pattern. If any regular pattern is located in the frames of the image, the processor 204 may further confirm whether such pattern is associated with the flicker before any further processing is performed.

A light intensity information 34 represents the changes in the light intensity corresponding to the electronic current 30 and the frame 32. The horizontal axis shows a time line and the frames while the vertical axis shows the light intensity. According to the curve of the light intensity information 34, each intensity cycle 340 takes only half of the time that the switch cycle 301 takes. Each intensity cycle 340 includes a maximum light intensity ($I_{max}$) and a minimum light intensity ($I_{min}$), wherein the maximum light intensity ($I_{max}$) corresponds to the peak (P) or valley (V) of the electronic current 30, and the minimum light intensity ($I_{min}$) corresponds to the zeros in value of the electronic current 30 ($Z_0$, $Z_1$, or $Z_2$).

Figure 3:
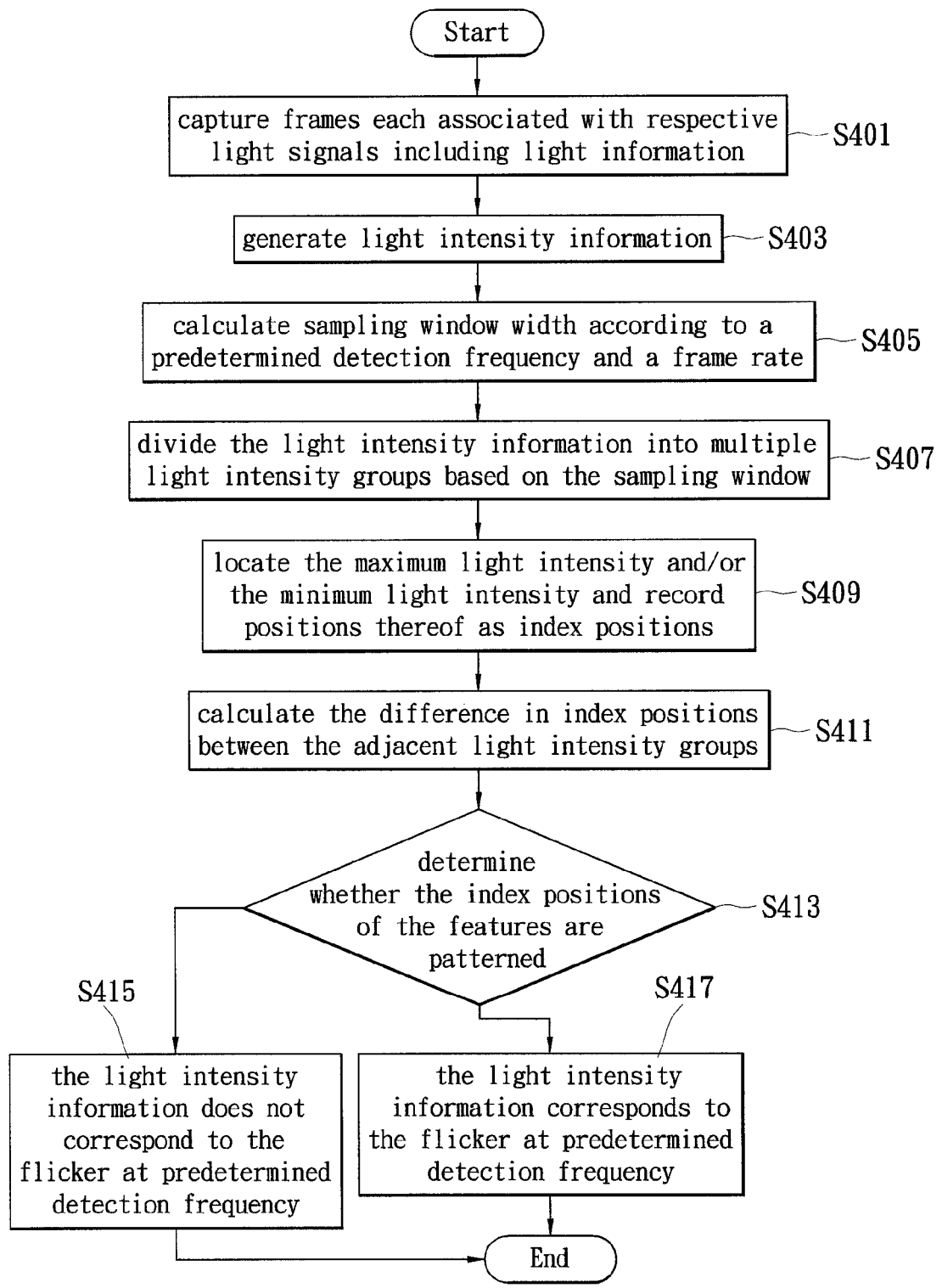
FIG. 3 shows a flow chart of a flicker detection method according to an embodiment of the present invention.

Based on the image sensing device 20 shown in FIG. 1, and the relation between the current switch and the light intensity shown in FIG. 2, FIG. 3 provides a flow chart of a flicker detection method by an image sensing device according to an embodiment of the present invention. The sensor 200 continuously captures a series of frames according to a predetermined frame rate, wherein the frames are associated with respective light signals including light information (S401). The frame rate might be pre-recorded in the image sensing device 20 at which rate the sensor 200 may automatically capture the frames. For example, the image sensing device 20 might sense the light intensity in the light information of the frames at 10 thousand frames per second.

A continuous curve indicative of the light intensity information (such as the light intensity information 34) is generated from the light information in the frames (S403).

The processor 204 is configured to compute a sampling window width based on the predetermined frame rate and a predetermined detection frequency for flickers (S405). Common flickers may take place every 1/100 seconds or 1/120 seconds, while every frame is representative of 1/10,000 seconds of the light signal (when frame rate is 10,000 frames per second). In order to determine whether the light intensity information associated with the multiple frames 32 corresponds to the flicker at the predetermined detection frequency, the frames 32 are divided into many sampling windows of the predetermined sampling window width. An example is shown in FIG. 4, when the 120-Hz flicker is to be located and the frame rate is at 10,000 frames per second, a sampling window 344 may cover 83 frames by dividing 10,000 frames into 120 sampling windows.

Figure 4:
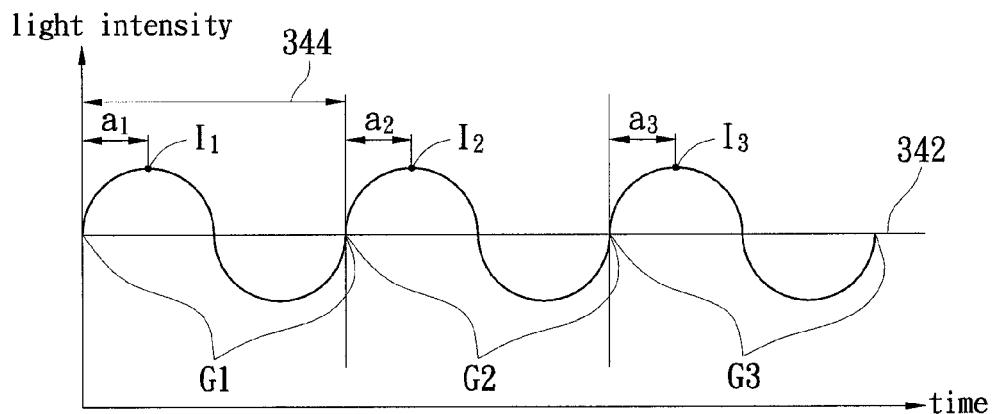
FIG. 4 shows a relation chart of the light intensity information and the sampling window width of the present invention (flicker frequency and frame rate are synchronous)

The light intensity information 34 is divided into multiple light intensity groups based on the sampling window width (S407), such as the G1, G2, and G3 in FIG. 4. FIG. 4 is an illustration of the light intensity groups, wherein the horizontal axis represents time and frames, and the vertical axis represents the light intensity. The processor 204 could generate several sampling window buffers (not shown) for buffering the light information of each light intensity group (G1 to G3) before computing the light intensity information based on the buffered light information.

If the light intensity information 34 is the 120-Hz flicker and is divided into multiple light intensity groups each covering every 1/120 seconds, each light intensity group G1 to G3 may be associated with a feature such as the presence of the maximum light intensity or the minimum light intensity in the same light intensity group. The processor 204 may be configured to locate the maximum light intensity and/or the minimum light intensity and record positions thereof as index positions (S409). For example, when the maximum light intensity (e.g., $I_1$, $I_2$, and $I_3$) is regarded as the feature, the position of the feature (i.e., the index position) such as $a_1$, $a_2$, and $a_3$ may be recorded. For instance, the index position $a_1$ of the feature $I_1$ is the 10th frame of the light intensity group G1; in other words, the index position $a_1$ is located $\frac{1}{12}$ seconds later than the start of the light intensity cycle associated with the light intensity group G1.

The processor 204 is configured to compute the difference between index positions of every two adjacent light intensity groups, in order to recognize whether the differences of the index positions are patterned (S411). Take G1 to G3 in FIG. 4 for an example, the difference might be the result of subtracting the index positions of two adjacent light intensity groups, like ($a_2-a_1$) and ($a_3-a_2$). In another implementation, the difference might be the differential value after processing the index positions by first order differential equations. The processor 204 may thereafter determine whether the subtracting results or the differential values are patterned (S413). When the subtracting results or the differential values do not remain the same, the index positions of the features are different in the light intensity groups. In other words, when the maximum (or minimum) light intensity is not present at the predetermined detection frequency on a regular basis, the light intensity information associated with that particular feature may not correspond to the flicker (S415). On the contrary, if the subtracting results or the differential values remain constant, which is indicative of the index positions are patterned (e.g., linearly patterned), such light intensity information may correspond to the flicker at the predetermined detection frequency (S417).

It is worth noting that for the purpose of illustration, the start point of the light intensity information 34 is the average of the light intensity 342 instead of the maximum light intensity or the minimum light intensity. Thus, both the maximum light intensity and the minimum light intensity could be shown in the same single sampling window. People skilled in the art might adjust the start point of the light intensity information 34 as well.

According to FIG. 4 and the abovementioned descriptions, if both the flicker in the light intensity information 34 and the frame rate are at their predetermined frequencies, the sampling window may be in synchronization with the intensity cycle, and every index position of every light intensity group would be the same.

However, in practice, the frame rate of the sensor 200 or the switch frequency of the AC power unit 10 might be affected by the frequency drift arising out of oscillators, both ending up not at the predetermined frequencies. As such, the intensity cycle may not be in synchronization with the switch cycle. Thus, step S409 shown in FIG. 3 would not be sufficient for determining whether the light intensity information 34 corresponds to the flicker at the predetermined detection frequency. And step S411 for determining whether the difference (e.g., the subtracting results or the differential values) between the index positions of the adjacent light intensity groups may become necessary for confirming if the light intensity information 34 corresponds to the flicker.

Figure 5:
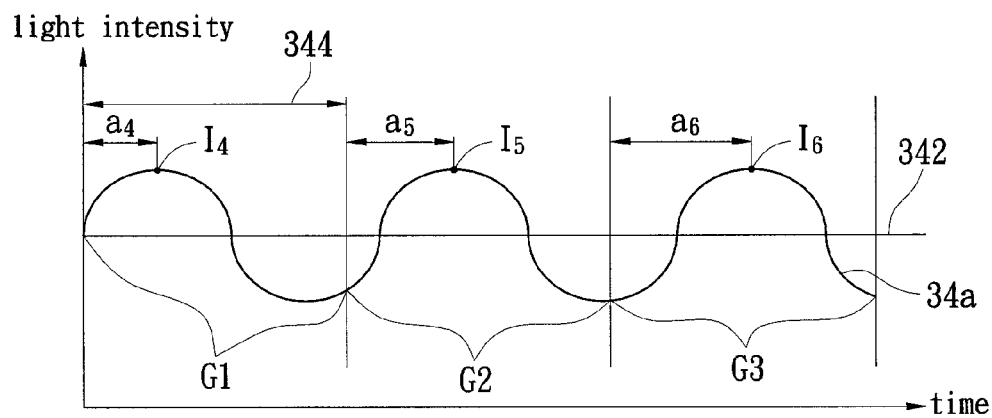
FIG. 5 shows another relation chart of the light intensity information and the sampling window width of the present invention (lower flicker frequency)

Refer to FIG. 5, wherein the frame rate and the predetermined detection frequency are at the same when compared with their counterparts in FIG. 4, but the switch frequency of the AC power unit 10 becomes lower due to the frequency drift. For example, the actual switch frequency of the AC power unit 10 is only 55 Hz instead of 60 Hz. Hence, the frequency of curve indicative of the light intensity information 34a is lowered accordingly, which causes the intensity cycles not to be in synchronization with the sampling windows 344. However, as long as the differences are patterned that the index positions $a_4$, $a_5$, and $a_6$ of the features $I_4$, $I_5$, and $I_6$ in the light intensity groups G1 to G3 are different may not undermine the determination of whether the light intensity information 34a is the flicker that may periodically switch between "bright" and "dark." More specifically, the index positions in the light intensity cycles may regularly increase so that the index positions may be considered as patterned. In other words, in the timeline of the light intensity cycle the index position $a_6$ is later than the index position $a_5$, which is later than the index position $a_4$.

Figure 6:
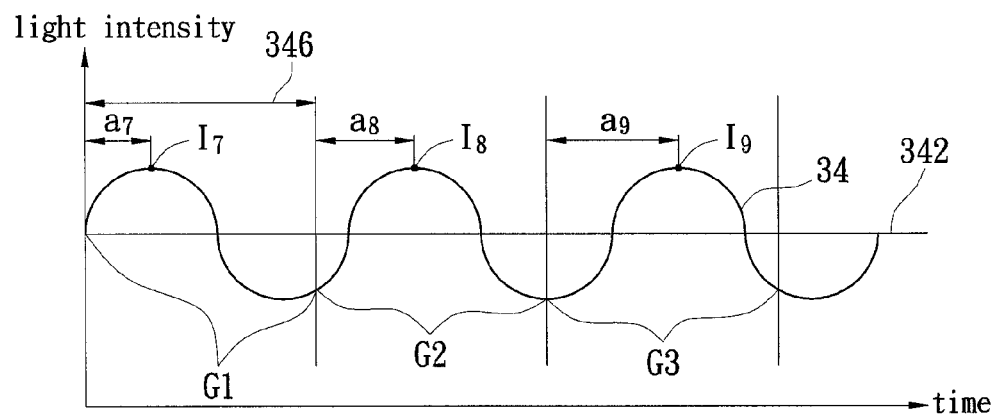
FIG. 6 shows another relation chart of the light intensity information and the sampling window width of the present invention (higher frame rate)

On the contrary, FIG. 6 illustrates a relationship between the index positions of the features when the frame rate increases. For example, the predetermined frame rate is 10,000 frames per second, but the actual frame rate is 12,000 frames per second. When each sampling window 346 still includes 83 frames, the width of the sampling window 346 is shorter than the intensity cycle, causing the intensity cycles to be in no synchronization with the sampling windows. Although the index positions $a_7$, $a_8$, and $a_9$ of the features $I_7$, $I_8$, and $I_9$ in the groups G1 to G3 are different accordingly, the index positions may still be considered as patterned since the index positions of the features in the intensity cycles may be present in a gradually belated fashion in the timeline of the intensity cycles.

Figure 7:
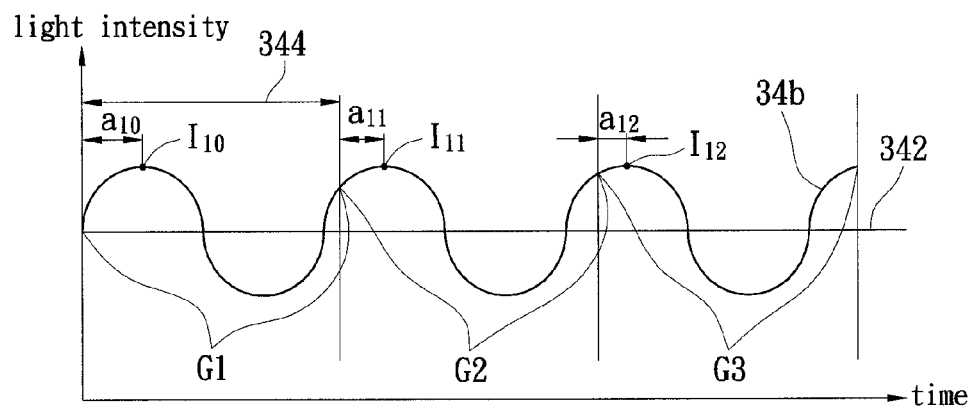
FIG. 7 shows another relation chart of the light intensity information and the sampling window width of the present invention (higher flicker frequency)

FIG. 7 further illustrates the relationship between the index positions of the features when the intensity frequency of the light intensity information 34b increases while other settings remain the same as shown in FIG. 4. The sampling window 344 would be of the width (time period) that is larger than the intensity cycle, resulting in the index position $a_{10}$ of the feature in the light intensity group G1 is belated in the timeline of the light intensity cycle when compared with the index position $a_{11}$ of the feature in the light intensity group G2, which is still earlier than the index position $a_{12}$ of the feature in the light intensity groups G3. Even so, the index positions as well as the difference between the index positions may still be considered patterned.

Figure 8:
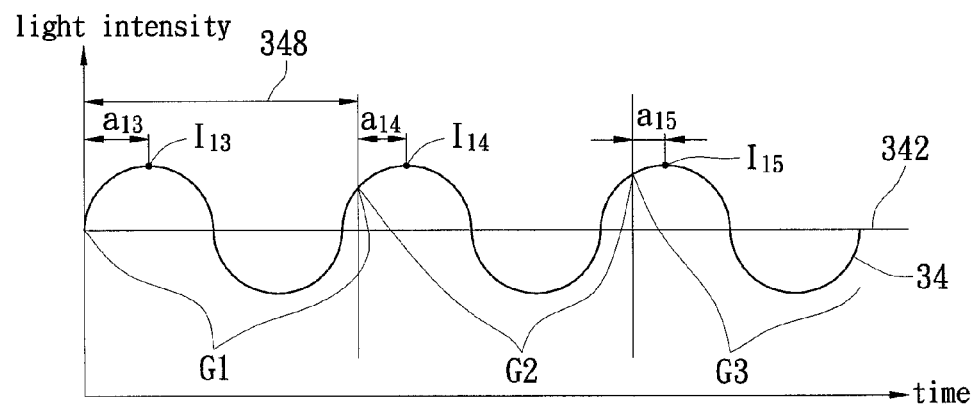
FIG. 8 shows another relation chart of the light intensity information and the sampling window width of the present invention (lower frame rate)

On the other hand, as shown in FIG. 8, while the frame rate decreases and other settings stay the same as shown in FIG. 4, the sampling window 348 would be of the width that is longer than the time period of the intensity cycle. Therefore, in the timeline of the light intensity cycles the index position $a_1 3$ of the feature in the light intensity group G1 is later than the index position $a_1 4$ of the feature in the light intensity group G2, which is later than the index position $a_1 5$ of the feature of the light intensity group G3.

Figure 9:
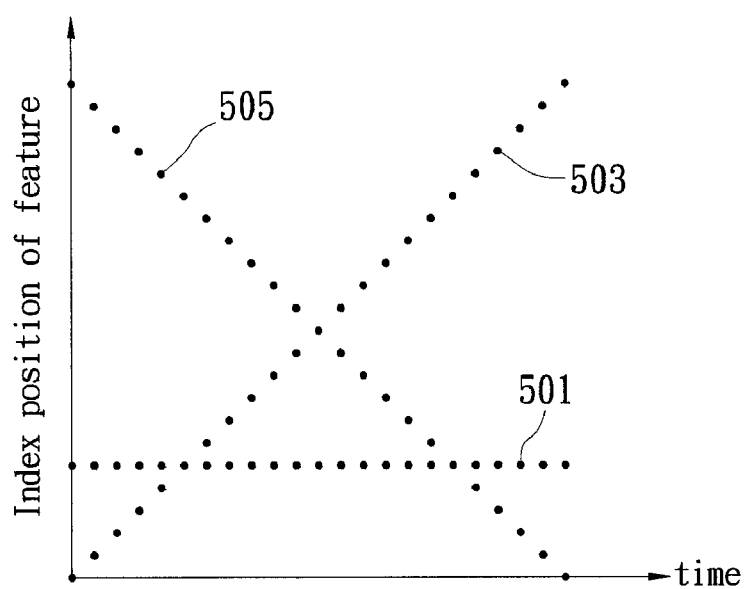
FIG. 9 shows a relation chart of the features' index positions and time according to the method embodiment of the present invention.

Refer to FIG. 9, which is a relation chart of the index position of each light intensity group's feature. The horizontal axis represents time, and the vertical axis represents the position of the feature. The dotted line 501 represents the index positions of every light intensity group's feature are the same, which reflects the index positions of the features shown in FIG. 4. The dotted line 503 shows that the index positions of every light intensity group's feature gradually increase, as shown in FIGS. 5 and 6. The dotted line 505 shows that the index positions of every light intensity group's feature gradually decrease, as shown in FIGS. 7 and 8.

Figure 10:
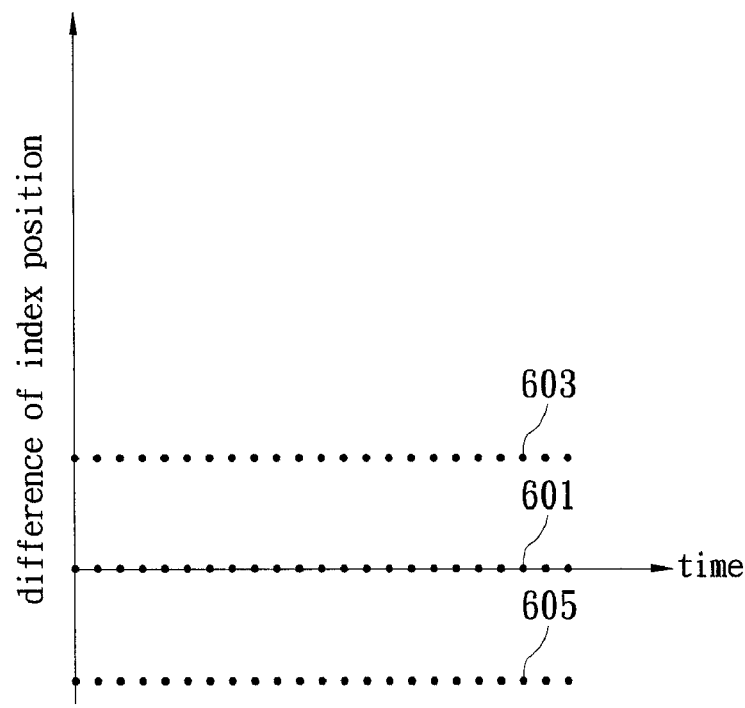
FIG. 10 shows a relation chart of the index positions' differences and time according to the method embodiment of the present invention.

The values of the index positions in the adjacent light intensity groups might be subtracted or differentiated to get a difference. The differences in the index positions of the features may be used for determining whether the changes in the index positions are patterned. If all the differences are constant, the index positions of the features in each light intensity group are the same. The data shown in FIG. 9 may be further processed (e.g., differentiated by first-order differential equation) and the result is shown in FIG. 10. In FIG. 10, the dotted line 601 represents the differentiation result of the dotted line 501. The dotted line 501 itself reveals a constant value of every index position, so that the differentiation result is 0. The dotted line 603 represents the differentiation result of the dotted line 503, which corresponds to a positive constant value. The dotted line 605 represents the differentiation result of the dotted line 505, which corresponds to a negative constant value. No matter the differentiation result is positive or negative, the features in every light intensity group may be regularly patterned so long as the differentiation result remains a constant.

In another embodiment, the differences resulted from the subtraction or differentiation of the index positions might be subtracted or differentiated again before a second-order differentiation result could be obtained for the determination of whether the light intensity information is associated with the flicker at the predetermined frequency. If the second-order differentiation result is 0, the light intensity information may correspond to the flicker at the predetermined frequency.

Therefore, even if the frequency drift in the frame rate or in the flicker frequency takes place, causing the light intensity cycle not in the synchronization with and the sampling window, the present invention would still be able to determine whether the light intensity information corresponds to the flicker at the predetermined frequency according to the pattern of the difference in the index positions of the features.

Both the linear sensor and the area sensor could detect multiple pixels at one time. Each pixel in a frame sensed by the sensor might include the light information as the basis of the computation of the light intensity information utilized in the present invention. Hence, in the present invention, the image sensing device could determine the presence of several different flickers, as long as the frame rate is known. In one implementation, the pixels in the image sensing device may be divided into two distinct groups, two of which are for determining the presence of the flickers of different frequencies, respectively.

In summary, the present invention discloses a flicker detecting method for an image sensing device, based on the characteristic associated with the flicker frequency. The present invention device needs no extra element for identifying the light intensity frequency, and still could detect any frequency of flicker, even several different flicker frequencies at one time.

Furthermore, the present invention uses the "position" of the maximum or minimum light intensity to determine the pattern, instead of the "value" of the light intensity, eliminating the possibility that the result may be affected by the values.

Besides, the present invention could be broadly applicable especially when the frame rate and/or the switch frequency of the AC power unit may change as the result of the frequency drift.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A flicker detection method of an image sensing device having a sensor and a processor, the method comprising:
   sequentially detecting multiple frames of an image according to a frame rate, wherein each of the multiple frames includes a light signal;
   generating a light intensity information based on the light signals;
   determining a sampling window according to a predetermined detection frequency and the frame rate;
   dividing the light intensity information into multiple light intensity groups in sequence according to the sampling window, wherein each light intensity group corresponds to a number of the multiple frames determined by the sampling window;
   distinguishing a feature of each light intensity group, and recording an index position of each feature in the light intensity groups, wherein the index position is defined by the sequence of the frame corresponding to the feature in the corresponding light intensity group;
   calculating, individually, a difference between the index positions of the adjacent light intensity groups; and
   determining whether the differences are in a regular pattern, in order to determine whether the light intensity information corresponds to a flicker.

2. The flicker detection method according to claim 1, after determining whether the differences between the index positions are in the regular pattern further comprising:
   when the differences are in the regular pattern determining that the light intensity information corresponds to the flicker at the predetermined detection frequency.

3. The flicker detection method according to claim 1, wherein determining whether the differences are in the regular pattern further comprises determining whether the differences are in a linear pattern.

4. The flicker detection method according to claim 1, wherein each feature is a greatest light intensity or a smallest light intensity of the corresponding light intensity groups.

* * * * *